US007727346B2

(12) United States Patent
Van Der Hoeven et al.

(10) Patent No.: US 7,727,346 B2
(45) Date of Patent: Jun. 1, 2010

(54) WROUGHT ALUMINIUM-MAGNESIUM ALLOY PRODUCT

(75) Inventors: Job Anthonius Van Der Hoeven, Haarlem (NL); Linzong Zhuang, Leiden (NL); Bruno Schepers, Brasschaat (BE); Peter De Smet, Sint-Martens-Latem (BE); Jean Pierre Jules Baekelandt, Lier (BE)

(73) Assignees: Corus Aluminum NV (BE); Corus Aluminum Walzprodukte GmbH (DE)

( * ) Notice: Subject to any disclaimer, the term of this patent is extended or adjusted under 35 U.S.C. 154(b) by 456 days.

(21) Appl. No.: 11/740,230

(22) Filed: Apr. 25, 2007

(65) Prior Publication Data

US 2007/0187009 A1 Aug. 16, 2007

Related U.S. Application Data

(62) Division of application No. 10/486,112, filed as application No. PCT/EP02/08627 on Jul. 31, 2002, now abandoned.

(30) Foreign Application Priority Data

| Aug. 10, 2001 | (EP) | ................................ 01203034 |
| Jan. 3, 2002 | (EP) | ................................ 02075049 |
| Jun. 24, 2002 | (EP) | ................................ 02077548 |

(51) Int. Cl.
*C22F 1/047* (2006.01)
(52) U.S. Cl. ....................................... 148/692; 148/696
(58) Field of Classification Search .................. 148/692, 148/696, 695
See application file for complete search history.

(56) References Cited

U.S. PATENT DOCUMENTS

| 4,108,691 A | 8/1978 | Stowell |
| 4,238,233 A | 12/1980 | Imaizumi et al. |
| 4,531,977 A | 7/1985 | Mishima et al. |
| 5,032,359 A | 7/1991 | Pickens et al. |
| 5,342,429 A | 8/1994 | Yu et al. |
| 5,417,919 A | 5/1995 | Ohori et al. |
| 5,437,746 A | 8/1995 | Usui et al. |
| 5,516,374 A * | 5/1996 | Habu et al. .................. 148/552 |
| 5,624,632 A | 4/1997 | Baumann et al. |
| 5,908,518 A | 6/1999 | Hoffmann et al. |
| 6,056,836 A | 5/2000 | Hoffmann et al. |
| 6,238,495 B1 | 5/2001 | Haszler et al. |
| 6,337,147 B1 | 1/2002 | Haszler et al. |
| 6,342,113 B2 | 1/2002 | Haszler et al. |
| 6,416,884 B1 | 7/2002 | Haszler et al. |
| 6,444,059 B2 | 9/2002 | Raynaud et al. |
| 6,695,935 B1 | 2/2004 | Haszler et al. |
| 6,848,233 B1 | 2/2005 | Haszler et al. |
| 2003/0145912 A1 | 8/2003 | Haszler et al. |
| 2004/0091386 A1 | 5/2004 | Carroll et al. |
| 2004/0109787 A1 | 6/2004 | Haszler et al. |
| 2004/0256036 A1 | 12/2004 | Van Der Hoeven et al. |
| 2008/0289732 A1 | 11/2008 | Van Der Hoeven et al. |

FOREIGN PATENT DOCUMENTS

| EP | 0769564 | 4/1997 |
| EP | 0799900 | 10/1997 |
| EP | 0823489 | 2/1998 |
| EP | 0909828 | 4/1999 |
| FR | 2329758 | 5/1977 |
| FR | 2717827 | 9/1995 |
| JP | 56163247 | 12/1981 |
| JP | 05331587 | 12/1993 |
| JP | 09165639 | 6/1997 |
| WO | 9526420 | 10/1995 |
| WO | 9942627 | 8/1999 |
| WO | 0026020 | 5/2000 |
| WO | 0054967 | 9/2000 |
| WO | WO 0066800 A1 * | 11/2000 |
| WO | 03016580 | 2/2003 |

OTHER PUBLICATIONS

Kikuchi, Masao, et al., "Aluminum alloy sheets for fuel tanks and their manufacture by pickling or grinding", Paper No. XP002177785, Chemical Abstracts, vol. 127, No. 8, Columbus, Ohio, US (Aug. 25, 1997).
Office Action issued in U.S. Appl. No. 10/486,103 mailed Jul. 26, 2006.
Office Action issued in U.S. Appl. No. 10/486,103 mailed Apr. 1, 2005.
Office Action issued in U.S. Appl. No. 10/486,103 mailed Dec. 14, 2005.
Final Office Action issued in U.S. Appl. No. 10/486,103 mailed Dec. 29, 2006.
Office Action issued in U.S. Appl. No. 10/486,103 mailed Sep. 5, 2007.
Final Office Action issued in U.S. Appl. No. 10/486,103 mailed Jan. 31, 2008.
Office Action issued in U.S. Appl. No. 12/181,996 mailed Sep. 11, 2009.
ASM Handbook, vol. 2 Properties and Selection: Nonferrous Alloys and Special-Purpose Materials, ASM International, 1990, p. 46.
Raynaud G.M. "New Aluminum Products" pp. 1-18, XP000671311 (Sep. 20, 1995).
ASM Specialty Handbook: Aluminum and Aluminum Alloys ASM International 1993, pp. 40-41.
"Aluminum and Aluminum Alloys", ASM International, 1993, pp. 376-377.

(Continued)

*Primary Examiner*—Roy King
*Assistant Examiner*—Janelle Morillo
(74) *Attorney, Agent, or Firm*—Novak, Druce + Quigg LLP

(57) ABSTRACT

A method of making a wrought aluminium-magnesium alloy rolled product, having a composition (in wt. %) of: $3.1<Mg<4.5$; $0.4<Mn<0.85$; $0.4<Zn<0.8$; $0.06<Cu<0.35$; $0.06<Cr<0.2$; $Fe<0.35$; $Si<0.2$; $Zr<0.05$; $Ti<0.3$; impurities $\leq 0.05$ each up to a total of max. 0.15, and balance aluminium.

7 Claims, No Drawings

OTHER PUBLICATIONS

Carroll, M.C. et al, "Effects of minor Cu additions on a Zn-modified Al-5083 alloy", Materials Science and Engineering A319-321 (Dec. 2001), pp. 425-428.

"Aluminum and Aluminum Alloys", ASM International, 1993, p. 64, 72.

* cited by examiner

WROUGHT ALUMINIUM-MAGNESIUM ALLOY PRODUCT

This application is a divisional application of U.S. patent application Ser. No. 10/486,112 filed on 9 Feb. 2004, abandoned, which was a 371 National Stage Application of International Application No. PCT/EP2002/08627, filed on 31 Jul. 2002, claiming the priority of European Patent Application No. 01203034.2 filed 10 Aug. 2001, European Patent Application No. 02075049.3 filed 3 Jan. 2002 and European Patent Application No. 02077548.2 filed 24 Jun. 2002, all of which are incorporated herein by reference.

The invention relates to a wrought aluminium alloy product, in particular a rolled aluminium-magnesium alloy product. In another aspect, the invention relates to a welded structure, comprising such a wrought aluminium alloy product.

Such aluminium-magnesium products are known to be used in the form of sheets or plates in the construction of welded or joined structures such as marine, automotive, and aircraft applications, storage tanks, pressure vessels, land or marine structures. Wrought products are products that have been subjected to mechanical working by such processes as rolling, extruding, or forging. Rolled products may have a gauge to about 200 mm.

A well-known standard alloy having appropriate formability and weldability, is the Aluminium Association (AA) 5454 alloy having the nominal composition, in wt. %:

$2.4 \leq Mg \leq 3.0$
$0.50 \leq Mn \leq 1.0$
$Zn \leq 0.25$
$Cu \leq 0.10$
$0.05 \leq Cr \leq 0.20$
$Fe \leq 0.40$
$Si \leq 0.25$
$Ti \leq 0.20$
others $\leq 0.05$ each, and in total max. 0.15;
and balance aluminium.

Although the formability and weldability of the standard AA5454 alloy are sufficient for many applications, the alloy does not meet the desired higher strength levels. There is a constant drive toward down-gauging, for which a basic requirement is to increase the strength. With the fairly low Mg-level, the alloy product is not susceptible to intergranular corrosion ("IGC").

Standard aluminium alloy AA5083, which has a Mg content of between 4.0 and 4.9 wt. %, is known to be susceptible to IGC. This is highly undesirable, because an alloy product that has low resistance against IGC cannot be used in a reliable manner, in particular at service temperatures above 65° C.

It is an object of the invention to provide an aluminium alloy wrought product having a higher strength, when compared in a similar temper, than the standard AA5454 alloy, and a formability that is at least as good as the formability of the standard AA5454 in a similar temper, and that is also at least as well weldable.

It is another object of the invention to provide a wrought alloy product that has similar mechanical properties, when compared in a similar temper condition, as the standard AA5083 alloy, in particular regarding strength and formability, and at the same time has an improved resistance against IGC over the standard AA5083, at lest when the AA5083 is in an O-temper condition.

It is yet another object of the invention to provide a wrought alloy product that has similar mechanical properties, when compared in a similar temper condition, as the standard AA5083 alloy, in particular regarding strength and formability, and at the same time has a resistance against IGC that is similar to that of a standard AA5454 alloy, or better.

According to the invention there is provided an aluminium-magnesium alloy in the form of a wrought product, having a composition (in wt. %) of:

$3.1 < Mg < 4.5$
$0.4 < Mn < 0.85$
$0.4 < Zn < 0.8$
$0.06 < Cu < 0.35$
$Cr < 0.25$
$Fe < 0.35$
$Si < 0.2$
$Zr < 0.25$
$Ti < 0.3$
impurities each $\leq 0.05$, and a total of max. 0.15;
and balance aluminium.

By the invention can be provided a wrought alloy product that has a higher strength than AA5454. Also, the welded joints can have a higher strength than the standard AA5454 welds when using the same or similar temper material. Surprisingly, the product according to the invention has good resistance against corrosion, in particular against IGC. It has been thought in the past that resistance against IGC is normally reduced when the Mg content exceeds about 3.0 wt. %, but the resistance against IGC of the product according to the invention is high compared to known AA5xxx-series wrought products with a Mg content exceeding 3.1 wt. %.

It has been found that the wrought alloy product according to the invention has a weight loss of less than 15 mg/cm$^2$, in particular even less than 10 mg/cm$^2$, at in the best examples even less than 6 mg/cm$^2$, when tested in accordance with ASTM G67, after sensitising at a temperature of 100° C. during 100 hours.

It is believed that the improved balance of properties available with the invention, particularly the higher strength in combination with the improved corrosion resistance, in particular against IGC, results from the balanced combination of the alloying elements Mg, Mn, Zn, and Cu in the given ranges. Particularly, it is believed that the Cu and the Zn levels in the ranges according to the invention contribute to the strength of the wrought aluminium alloy product, and at the same time optimise the resistance against corrosion, in particular the resistance against IGC and exfoliation corrosion.

Mg is the primary strengthening element in the alloy product. Mg levels above 3.1 wt. % do provide the required strength. The amount of Mg should not exceed 4.5 wt. %, in order to make possible to obtain the required corrosion resistance. Preferably, the amount of Mg does not exceed 4.4 wt. % which is good for the fracture toughness and for the ease of manufacturing. In an embodiment, the amount of Mg is more than 3.6 wt. %. Herewith the desired balance of characteristics of the alloy product is better achieved. It is particularly surprising that even having more than 3.6 wt. % Mg, but less than 4.5 wt. %, the resistance against IGC remains sufficiently good. Preferably, the lower limit of Mg is 3.8 wt. %, and more preferably the amount of Mg is higher than 4.05 wt. %, by which an alloy product is provided with a better optimised balance of tensile strength and yield strength, and corrosion behaviour.

Mn is an essential alloying element. In combination with Mg, Mn provides the strength in the wrought product as well as in the welded joints of the alloy. Mn levels below 0.4 wt. % cannot provide sufficient strength to the welded joints of the alloy. Above 0.85 wt. %, the desirable formability characteristics of the alloy product suffer too much. In an embodiment, the amount of Mn does not exceed 0.69 wt. %, and preferably does not exceed 0.6 wt. %, to further optimise the formability in the balance of mechanical properties. It is moreover preferred that the amount of Mn is more than 0.45 wt. %, more preferably Mn is more than 0.5 wt. %, in order to obtain sufficient strength in the balance of mechanical properties.

Zn is an important additive for corrosion resistance of the alloy and for the formability. At least 0.4 wt. % Zn addition is required in order to achieve sufficient resistance against IGC. At a Zn content above 0.8 wt. %, the uniform elongation is significantly reduced and thereby adversely affecting the formability of the alloy product, e.g. the reverse bendability is adversely affected. In an embodiment, the amount of Zn does not exceed 0.75 wt. %, for good insurance against exfoliation in combination with a good formability. It is preferred that the amount of Zn does not exceed 0.6 wt. %, in order to further optimise the balance of desired characteristics of the alloy product.

Surprisingly, in a narrow range Cu has been found to increase the resistance against IGC even though the Mg content is relatively high. Normally, a deliberate Cu addition is avoided in aluminium-magnesium alloys of this type, since it is thought to harm the resistance against corrosion. When Cu is present above 0.06 wt. %, a positive effect has been found on the resistance against corrosion. However, Cu should be kept below 0.35 wt. % in order to avoid an adverse effect on the resistance against corrosion, in particular in the resistance against pitting corrosion. In an embodiment, the amount of Cu is more than 0.075 wt. %, and more preferably more than 0.1 wt. %. Herewith a good resistance against IGC is better save guarded. In embodiment, the amount of Cu does not exceed 0.24 wt. %. Herewith the balance of desired characteristics is better achieved. Preferably the amount of Cu not exceeding 0.18 wt. %, in order to preserve the corrosion resistance in a weld zone. It is more preferred if Cu does not exceed 0.15 wt. %, to better ensure good corrosion resistance in a weld zone. Also, the general resistance against IGC in the product is improved.

Fe is not an essential alloying element, but it is usually present in the alloy because it is often present in source material. Fe forms Al—Fe—Mn compounds during casting, thereby limiting the beneficial effects of Mn. Therefore Fe must not be present in an amount of 0.35 wt. % or more. For the mechanical properties of the product, in particular the formability, the amount of Fe is preferably kept below 0.2 wt. %.

Si is not an essential alloying element. It also combines with Fe to form coarse Al—Fe—Si phase particles which can affect the fatigue life and fracture toughness of the welded joints of the alloy. For this reason, the Si level is kept to a maximum of 0.2 wt. %. Preferably the amount of Si is kept to a maximum of 0.12 wt. %, and more preferably at a maximum of 0.10 wt. % in order to better ensure a favourable formability characteristics of the alloy product.

Zr is not essential for achieving the improved corrosion performance in the alloy product, but it can have an effect to achieve a fine grain refined structure in the fusion zone of welded joints. Zr levels above 0.25 wt. % are to be avoided, since that tends to result in very coarse needle-shaped primary particles with decrease in ease of fabrication of the alloys and in the formability of the wrought alloy product.

Zr may cause to form undesirable coarse primaries, in particular together with Ti. In an embodiment of the invention, the amount of Zr does therefore not exceed 0.05 wt. %. Moreover, it may be favourable to keep Zr out of scrap material for specific recycling reasons. To this extend, it is more preferred to limit the presence of Zr to less than 0.01 wt. %.

Ti is often used as a grain refiner during solidification of both cast ingots and welded joints produced using the alloy product of the invention. This effect is obtained with a Ti content of less than 0.3 wt. %, and preferably less than 0.15 wt. %. Ti may be replaced in part or in hole by V in the same compositional range.

Cr is an optional alloying element, that improves further the corrosion resistance and strength of the alloy product. However, Cr limits the solubility of Mn and, if present, also that of Zr. Therefore, to avoid formation of undesirable coarse primaries, the Cr level must not be more than 0.25 wt. %. In a preferred embodiment, the Cr is present in a range of 0.06 to 0.2 wt. %, and more preferably in the range of 0.11 to 0.2 wt. %.

It is convenient for many applications if the wrought aluminium alloy product is a rolled aluminium alloy product, such as a sheet or a plate product.

The aluminium alloy product may be provided in a wide range of gauges, for example up to 200 mm, but a preferred gauge for the aluminium alloy product according to the invention is in the range of 0.7 to 4 mm, and more preferably in the range of 1.6 to 2.4 mm.

The alloy product according to the invention can be delivered in various temper conditions. However, for the group of applications for which the alloy product is ideally suited, it should be a temper similar to a soft worked temper, also known as an "O"-temper, or, in case of sheets or plates, a light "H"-temper such as for example H111-temper.

In an embodiment of the invention, the tensile strength of the alloy product in O-temper at 50° C., even after holding the product at this temperature for 1,000 hours, is at least 280 MPa, and the proof strength at 50° C., even after holding the product at this temperature for 1000 hours, is at least 130 MPa. Herewith is achieved that the wrought alloy product has sufficiently good and sustainable mechanical properties at operating conditions.

Preferably, the proof strength of the wrought alloy product at 100° C., even after holding the product at this temperature for 1,000 hours, is at least 120 MPa, and more preferably at least 125 MPa. Herewith is achieved that the wrought alloy product has sufficiently good and sustainable mechanical properties at more severe operating conditions.

The elongation value A50 of the product according to the invention is at least 20%. Herewith is achieved that the elongation, which is a measure for the formability, is at least as good as that of a standard AA5083 alloy in a similar, soft worked, temper condition.

The invention further relates to a welded structure comprising at least one section of the product according to one of the above described embodiments. The alloy according to one or more embodiments of the invention is eminently suitable for application in such a welded structure due to its excellent weldability, and its high strength in a weld zone.

The invention further relates to a pressure vessel, in particular a welded pressure vessel, comprising a shell that comprises the wrought, in particular rolled, aluminium-magnesium alloy product according to an embodiment as is described above. Due to the increased strength, such pressure vessel can be down-gauged to have a lower weight. Moreover, the corrosion properties can be improved. The pressure vessel according to this aspect of the invention can be used at a higher service temperature, in particular above 65° C.

The invention further relates to an air suspension system, in particular for an automotive vehicle, comprising the above described pressure vessel.

The invention further relates to a braking system for a transport vehicle, comprising the above described pressure vessel.

The invention further relates to a transport vessel comprising such a braking system or air suspension system. The transport vehicle can in particular be an automotive vehicle comprising the above mentioned braking system. Because of the good corrosion properties, the braking system or the air suspension system can be mounted in an exposed way to the vehicle.

In another aspect, the invention relates to a method of producing a wrought aluminium alloy product comprising the subsequent steps of:

i. providing an intermediate alloy product having a composition according to the inventive composition mentioned above;

ii. cold working the intermediate alloy product to a final gauge to obtain an intermediate wrought product;

iii. annealing the intermediate wrought product by heating the product at a heating rate in the range of 2 to 200° C./sec, holding the product at a soaking temperature in the range of 480 to 570° C. for a duration of up to 100 sec, followed by a cooling at a cooling rate in the range of 10 to 500° C./sec to below a temperature of 150° C.

By this method it is achieved that the positive influence of Cu on the resistance against IGC is fully exploited. Although the wrought aluminium alloy product has good properties when other annealing schemes are applied, it is believed that the positive influence of Cu on the corrosion properties is enhanced by the annealing scheme of step iii.

This annealing scheme can be applied in a continuous annealing facility. The required heating rates can be achieved, for example, by homogeneous heating by means of inductive heating. This gives improved mechanical properties to the sheet. The required heating and cooling rates may be possible to achieve for gauges up to 4 mm, but the required rates are particularly feasible when the gauge is thinner than 2.4 mm.

Particularly favourable results have been obtained in an embodiment of the method wherein the soaking temperature is in the range of between 520 and 550° C.

The balance of characteristics of the product produced by the method is found to be better optimised in an embodiment wherein the product is held at the soaking temperature for a duration of up to 40 sec.

In an embodiment, the heating rate is at least 50° C./sec, and preferably at least 80° C./sec. Herewith, the balance between the mechanical properties and the resistance against IGC has been found to be more favourable. This is especially the case when the cooling rate after soaking is at least 100° C./sec.

The invention will now be explained with reference to laboratory experiments.

Various slabs were cast having chemical compositions as shown in the following Table 1, balance aluminium. The slabs A and B correspond to a standard AA5454 alloy and a standard AA5083 alloy, respectively, and Slabs C to F are according to the invention.

TABLE 1 compositions (in wt %) of the cast slabs (balance Al and impurities)

| Slab | Inv. | Mg | Mn | Zn | Cu | Cr | Fe | Si | Zr | Ti |
|------|------|------|------|------|-------|------|------|------|--------|-------|
| A | No | 2.7 | 0.75 | 0.02 | 0.005 | 0.10 | 0.30 | 0.16 | 0.001 | 0.02 |
| B | No | 4.5 | 0.50 | 0.03 | 0.005 | 0.10 | 0.31 | 0.16 | 0.001 | 0.015 |
| C | Yes | 4.29 | 0.50 | 0.54 | 0.085 | 0.14 | 0.14 | 0.04 | 0.001 | 0.02 |
| D | Yes | 4.29 | 0.50 | 0.54 | 0.085 | 0.14 | 0.14 | 0.04 | 0.001 | 0.02 |
| E | Yes | 4.31 | 0.52 | 0.51 | 0.18 | 0.15 | 0.19 | 0.10 | <0.01 | 0.02 |
| F | Yes | 4.31 | 0.52 | 0.51 | 0.18 | 0.15 | 0.19 | 0.10 | <0.01 | 0.02 |

The processing of the slabs A to C and E comprised a pre-heat, a homogenisation anneal during 5 hours at a temperature of 540° C., hot rolling whereby the exit temperature was about 330° C., followed by cold rolling with 60% cold reduction and finally soft annealing in batch anneal at a temperature of 330° C. during 1 hour. The processing of slab D and F was identical to those of A to C and E, with the exception of the final soft anneal, which was a continuous anneal for 10 sec. at 530° C. Final gauges were 3 mm, and the plates were delivered in H111-temper.

These products were tensile tested according to EN 10002, and the results for the parallel (||) and perpendicular (⊥) directions are given in Table 2, and whereby (-) stands for not tested.

TABLE 2

Tensile strength ("UTS"), 0.2% Proof strength ("PS"), Elongation ("A50")

| Alloy | Direction of testing | UTS [MPa] | PS [MPa] | A50 [%] |
|-------|------|-----|-----|-----|
| A (AA5454) | \|\| | 237 | 108 | 19 |
|  | ⊥ | 233 | 107 | 20 |
| B (AA5083) | \|\| | 299 | 149 | 19 |
|  | ⊥ | 293 | 147 | 21 |
| C | \|\| | 299 | 141 | 19 |
|  | ⊥ | 293 | 139 | 21 |
| D | \|\| | 303 | 146 | 22 |
|  | ⊥ | 294 | 145 | 23 |
| E | \|\| | 300 | 141 | 19 |
|  | ⊥ | 296 | 141 | 21 |
| F | \|\| | 303 | 148 | 21 |
|  | ⊥ | 297 | 146 | 21 |

The alloy products have been subjected to a weight loss test according to ASTM G67 after sensitising at 100° C. for a duration of 100 hours in H111-temper condition. Results are shown in Table 3.

TABLE 3

Weight loss (in mg/cm$^2$) after sensitising.

|  | A | B | C | D | E | F |
|---|---|---|---|---|---|---|
| 100 hr at 100° C. | 6 | 36 | 22 | 14 | 11 | 7 |

This indicates that the corrosion resistance of products C to F are much better than of the standard AA5083 alloy (B). Products D to F are below 15 mg/cm², which is according to ASTM-G67 the upper limit for a product quality not susceptible to IGC. At the same time, as can be seen from Table 2, the elongation (A50) of product C to F are sufficiently high.

The resistance against IGC of products D and F in the presently used sensitising conditions show an improvement over that of C and E respectively, apparently by using the continuous anneal the corrosion resistance of the product is improved. It is expected that under more severe sensitising conditions the difference is more clearly visible.

Alloy product C was also tested in non sensitised condition, and in that condition it lost only 3 mg/cm².

Alloy products C to F were welded without any problem using TIG welding under standard conditions.

In an additional test series, the influence of Cu on the corrosion resistance was tested. Some additional slabs were cast having the chemical compositions as shown in the following table 4, balance aluminium.

The processing of the additional alloys was identical to the processing of alloys D and F, i.e. with a final soft anneal as a continuous anneal.

TABLE 4 composition (in wt %) of the cast slabs (bal. Al and impurities)

| Slab | Inv. | Mg | Mn | Zn | Cu | Cr | Fe | Si | Zr | Ti |
|---|---|---|---|---|---|---|---|---|---|---|
| G | No | 4.18 | 0.50 | 0.50 | 0.02 | 0.15 | 0.17 | 0.10 | <0.01 | 0.02 |
| H | Yes | 4.24 | 0.50 | 0.50 | 0.12 | 0.16 | 0.20 | 0.10 | <0.01 | 0.02 |
| J | Yes | 4.29 | 0.50 | 0.51 | 0.30 | 0.15 | 0.19 | 0.10 | <0.01 | 0.02 |
| K | No | 4.30 | 0.50 | 0.51 | 0.42 | 0.15 | 0.20 | 0.10 | <0.01 | 0.02 |

The alloy products have been subjected to a weight loss test according to ASTM G67 after sensitising at 100° C. for a duration of 100 hours in H111 temper condition. The alloy products have also been subjected to an ASSET test according to ASTM G66 after welding, followed by sensitising at 100° C. for a duration of 100 hours. The weld was a TIG weld using AA5183 as filler wire. Results are shown in table 5. The ASSET results correspond to the Heat Affected Zone (HAZ), because here the most severe attack is usually found.

TABLE 5

Weight Loss (in mg/cm²) and ASSET result after sensitising.

| Alloy | % Cu | WL [mg/cm²] | ASSET result in HAZ |
|---|---|---|---|
| G | 0.02 | 30 | N |
| D | 0.085 | 14 | PA |
| H | 0.12 | 8 | PA |
| F | 0.18 | 7 | PB |
| J | 0.30 | 6 | PB |
| K | 0.42 | 6 | PC |

According to ASTM G67 the upper limit for a product quality not susceptible to IGC is 15 mg/cm². In ASTM G66 the range to classify the results is given, but limits for acceptable or not acceptable are not specified. However, for a person skilled in the art, it is clear that pitting A is still acceptable whereas pitting C in unacceptable. Pitting B is for most applications still acceptable.

The results indicate that the resistance against IGC increases with increasing Cu content, but at the same time the resistance against pitting decreases. For a Cu level of 0.30 wt. % and lower, the resistance against pitting is acceptable and better than acceptable. The weight loss is thought to measure below 15 mg/cm² when the Cu level is above about 0.075 wt. %.

Based on these results it is concluded that the broadest operational window is found with Cu levels between 0.06 and 0.35 wt. %. Preferably the amount of Cu does not exceed 0.18 wt. % in order to preserve the corrosion resistance in a weld zone.

The invention claimed is:

1. Method of producing a wrought aluminium alloy rolled product comprising the steps of:
   (i) providing an intermediate alloy product, having a composition (in wt. %) consisting of:
   Mg 4.05 to 4.31
   Mn 0.5 to 0.6
   Zn 0.4 to 0.6
   Cu 0.085 to 0.18
   Cr 0.11 to 0.2
   Fe<0.2
   Si<0.12
   Zr<0.01
   Ti at most 0.02
   impurities each ≦0.05, total of max. 0.15,
   and balance aluminium;
   (ii) homogenization annealing a slab of the alloy;
   hot rolling the homogenization annealed slab to form an intermediate alloy product;
   cold working the intermediate alloy product by cold rolling to a final gauge of 0.7 to 4 mm to obtain an intermediate wrought product; and
   (iii) continuously annealing the intermediate wrought product by heating the product at a heating rate in the range of 80 to 200° C./sec, holding the product at a soaking temperature in the range of 520 to 550° C. for a duration of at most 40 sec,
   followed by a cooling rate in the range of 10 to 500° C./sec to below a temperature of 150° C. to arrive at plates in H111-temper;
   wherein the product after annealing has a weight loss after sensitising for 100 hours at 100° C. of less than 15 mg/cm² when tested against intergranular corrosion in accordance with ASTM G67.

2. Method according to claim 1, wherein the final gauge of the aluminium product is in a range of 0.7 to 2.4 mm.

3. Method according to claim 1, wherein the product after annealing has a weight loss after sensitising for 100 hours at 100° C. of less than 10 mg/cm² when tested against intergranular corrosion in accordance with ASTM G67.

4. Method according to claim 1, wherein the amount of Mn in the alloy product is more than 0.52 wt. %.

5. Method according to claim 1, wherein the amount of Cu in the alloy product is at least 0.12 wt %, wherein the product after annealing has a weight loss after sensitising for 100 hours at 100° C. of less than 15 mg/cm$^2$ when tested against intergranular corrosion in accordance with ASTM G67.

6. Method according to claim 1, wherein the amount of Cu in the alloy product is more than 0.1 wt. %.

7. Method according to claim 1, wherein the amount of Cu in the alloy product is less than 0.15 wt. %.

* * * * *